(12) United States Patent
Maruoka et al.

(10) Patent No.: US 11,292,387 B2
(45) Date of Patent: Apr. 5, 2022

(54) TOWING ASSISTANCE APPARATUS

(71) Applicant: AISIN CORPORATION, Kariya (JP)

(72) Inventors: Tetsuya Maruoka, Okazaki (JP);
Kazuya Watanabe, Anjo (JP); Kinji Yamamoto, Anjo (JP)

(73) Assignee: AISIN CORPORATION, Kariya (JP)

( * ) Notice: Subject to any disclaimer, the term of this patent is extended or adjusted under 35 U.S.C. 154(b) by 392 days.

(21) Appl. No.: 16/502,243

(22) Filed: Jul. 3, 2019

(65) Prior Publication Data
US 2020/0010018 A1    Jan. 9, 2020

(30) Foreign Application Priority Data

Jul. 5, 2018 (JP) .............................. JP2018-128596

(51) Int. Cl.
| | |
|---|---|
| *B60R 1/00* | (2006.01) |
| *G06T 1/00* | (2006.01) |
| *G06K 9/00* | (2006.01) |
| *B62D 15/02* | (2006.01) |
| *B62D 13/02* | (2006.01) |

(52) U.S. Cl.
CPC ............ *B60R 1/003* (2013.01); *B62D 13/025* (2013.01); *B62D 15/0295* (2013.01); *G06K 9/00805* (2013.01); *G06T 1/0007* (2013.01); *B60R 2300/301* (2013.01); *B60R 2300/302* (2013.01); *B60R 2300/303* (2013.01); *G06T 2207/30252* (2013.01)

(58) Field of Classification Search
CPC ..... B60R 1/00; B60R 1/003; B60R 2300/301; B60R 2300/303; B60R 2300/806; B60R 2300/70; B60R 2300/8066; B60R 2300/808; B60R 1/002; G06K 9/00805; G06T 1/0007; G06T 2207/30252; B60W 50/14
USPC ......................................................... 348/148
See application file for complete search history.

(56) References Cited

U.S. PATENT DOCUMENTS

| | | | | |
|---|---|---|---|---|
| 9,555,813 | B2 | 1/2017 | Strano | |
| 9,566,911 | B2* | 2/2017 | Greenwood | ............ H04N 7/183 |
| 2013/0321634 | A1* | 12/2013 | Okano | .................... G06T 11/00 |
| | | | | 348/148 |
| 2014/0267688 | A1* | 9/2014 | Aich | ................. B60W 50/0097 |
| | | | | 348/113 |
| 2016/0052548 | A1* | 2/2016 | Singh | ....................... B60D 1/36 |
| | | | | 701/37 |

* cited by examiner

*Primary Examiner* — Nathnael Aynalem
(74) *Attorney, Agent, or Firm* — Sughrue Mion, PLLC

(57) ABSTRACT

A towing assistance apparatus includes an image acquisition unit successively acquiring a rear image and a lateral image serving as a surrounding image captured by an imaging unit that is provided at a towing vehicle to which a towed vehicle is configured to be connected, an angle acquisition unit acquiring a connection angle between the towing vehicle and the towed vehicle, and a display processing unit switching the surrounding image displayed at a display unit from the lateral image to the rear image in a case where the connection angle becomes equal to or greater than a first angle at which a change control for decreasing the connection angle is impossible by a steering of the towing vehicle during a rearward driving thereof in a state where the lateral image is displayed and the towing vehicle to which the towed vehicle is connected is in a rearward driving available state.

5 Claims, 9 Drawing Sheets

TOWING ASSISTANCE APPARATUS

CROSS REFERENCE TO RELATED APPLICATIONS

This application is based on and claims priority under 35 U.S.C. § 119 to Japanese Patent Application 2018-128596, filed on Jul. 5, 2018, the entire content of which is incorporated herein by reference.

TECHNICAL FIELD

This disclosure generally relates to a towing assistance apparatus.

BACKGROUND DISCUSSION

A towing vehicle (a tractor) towing a towed vehicle (a trailer) is known. A towing device constituted by a towing bracket and a coupling ball (hitch ball), for example, is mounted at a rear portion of the towing vehicle and a towed device (a coupler) is mounted at an end (a front end) of the towed vehicle. By a connection between the hitch ball and the coupler, the towing vehicle tows the towed vehicle so that the towed vehicle is rotatable (swingable) about a portion where the hitch ball and the coupler are connected. In a case where the towing vehicle is driven rearward for parking, for example, i.e., in a case where the towed vehicle is pushed by the towing vehicle, the towed vehicle may operate differently from a steering state of the towing vehicle. Depending on a connection angle between the towing vehicle and the towed vehicle at the time, the towed vehicle may be greatly turned (tilted) relative to the towing vehicle at a portion where the towing device is disposed. In this case, the connection angle may be changed or corrected by steering of the towing vehicle during a rearward driving thereof. Nevertheless, when the connection angle reaches or exceeds a certain angle, the towed vehicle may be brought to a jackknife condition where the connection angle is impossible to be changed to decrease by the steering during the rearward driving of the towing vehicle. Therefore, a system is proposed for alerting a driver of the towing vehicle that the jackknife condition is established by detecting the connection angle. Such system is disclosed in U.S. Pat. No. 9,555,813B, for example.

According to the aforementioned alert system, the establishment of jackknife condition may be easily recognized by the driver. Nevertheless, a positional relation between the towing vehicle and the towed vehicle is not sufficiently understandable. In addition, only the alert of the jackknife condition may cause difficulty in recognition of the actual vehicle state, which may increase a feeling of anxiety of the driver of the towing vehicle. For example, in a case where the towed vehicle is greatly turned relative to the towing vehicle, the drive may feel anxiety that the towing vehicle and the towed vehicle may contact each other. Therefore, in a case where a positional relation between the towing vehicle and the towed vehicle is easily recognizable, i.e., the present state is easily recognizable, when the jackknife condition is established, the driver's feeling of anxiety may decrease and accurate operation (steering) determination may be obtained.

A need thus exists for a towing assistance apparatus which is not susceptible to the drawback mentioned above.

SUMMARY

According to an aspect of this disclosure, a towing assistance apparatus includes an image acquisition unit successively acquiring a rear image and a lateral image each of which serves as a surrounding image captured by an imaging unit that is provided at a towing vehicle to which a towed vehicle is configured to be connected, the rear image including a rear region of the towing vehicle and the lateral image including a lateral region of the towing vehicle, an angle acquisition unit acquiring a connection angle between the towing vehicle and the towed vehicle, and a display processing unit switching the surrounding image displayed at a display unit from the lateral image to the rear image in a case where the connection angle becomes equal to or greater than a first angle at which a change control for decreasing the connection angle is impossible by a steering of the towing vehicle during a rearward driving thereof in a state where the lateral image is displayed at the display unit and the towing vehicle to which the towed vehicle is connected is in a rearward driving available state.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment disclosed here is explained with reference to the attached drawings. Configurations of the embodiment described below, and operations, results, and effects brought about by such configurations are examples. The embodiment is achievable by other configurations than the following configurations and at least one of various effects based on the basic configuration and derived effects may be obtained.

Figure 1:
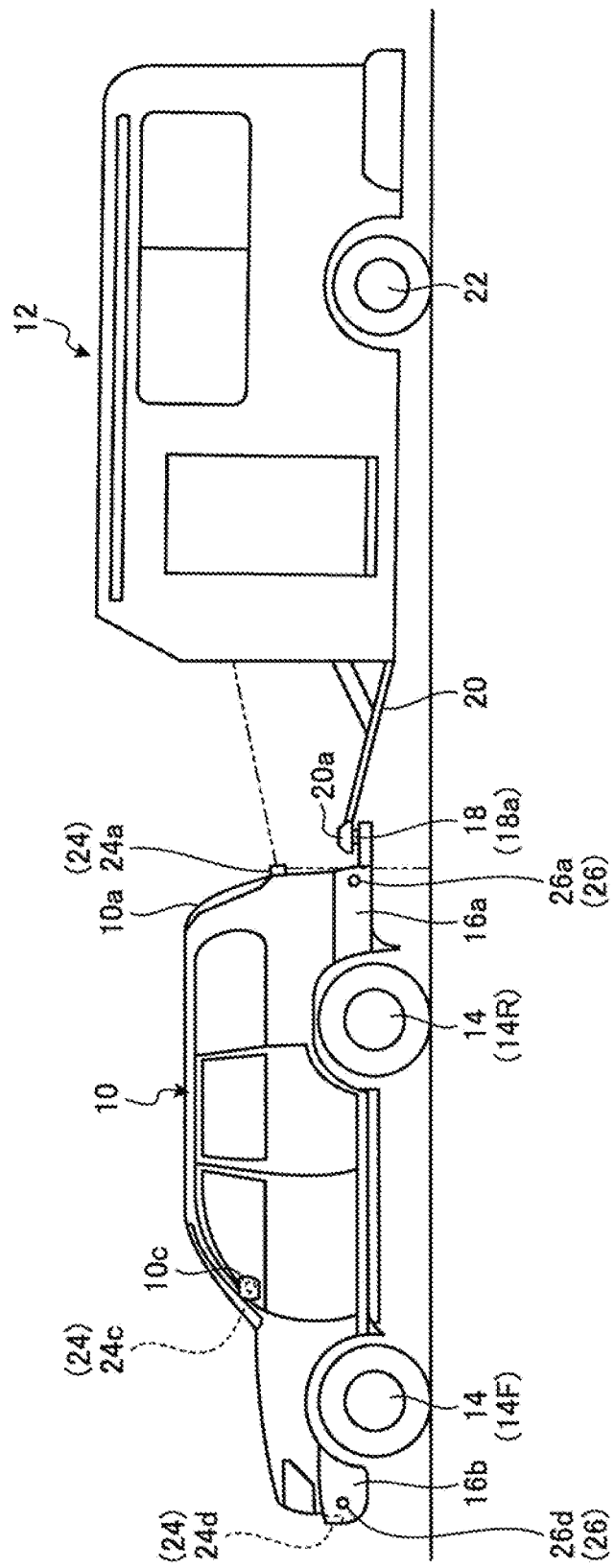
FIG. 1 is a side view schematically illustrating an example of a connection state between a towing vehicle where a towing assistance apparatus according to an embodiment is mounted and a towed vehicle.
Figure 2:
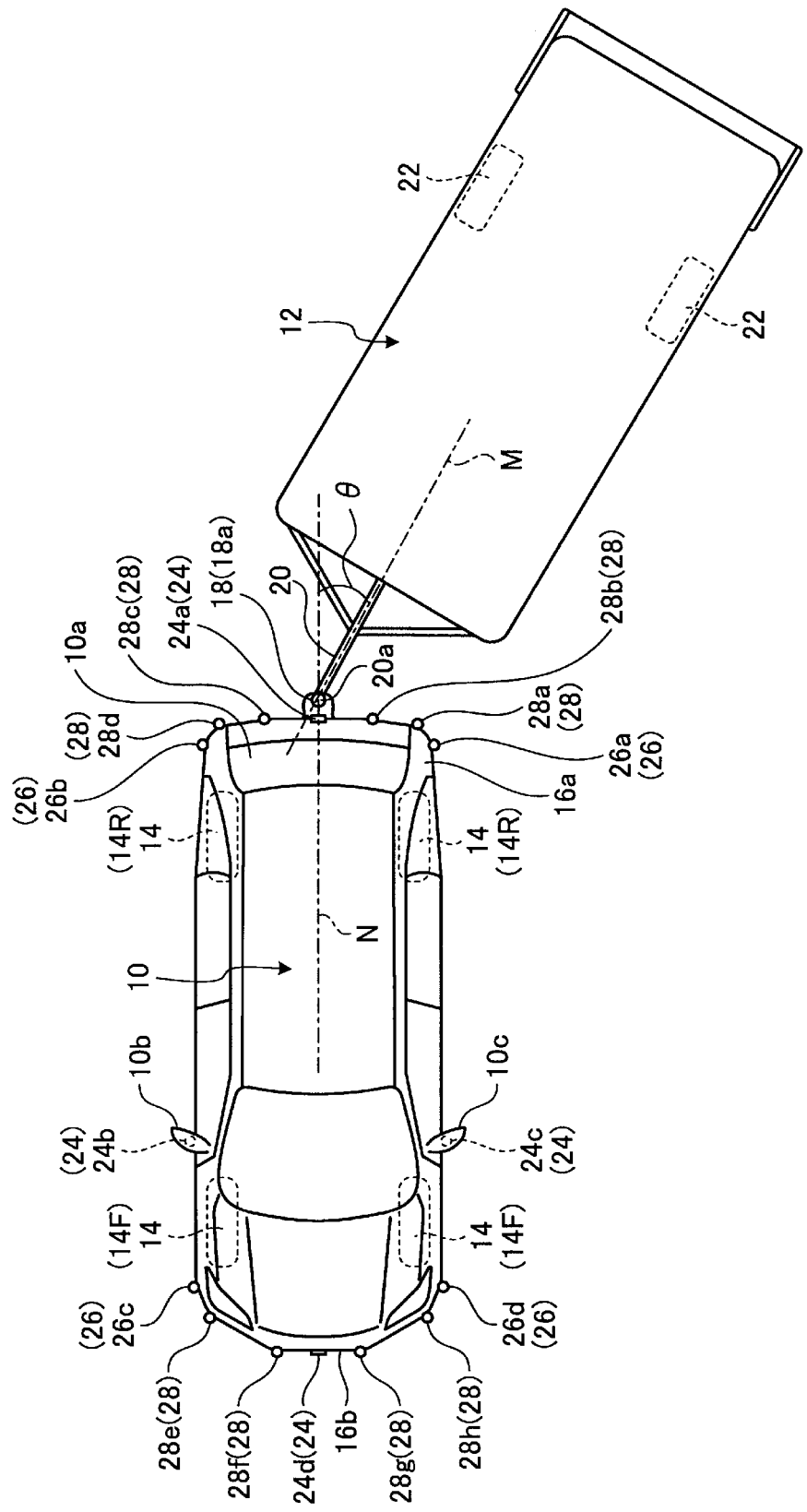
FIG. 2 is a top view schematically illustrating an example of the connection state between the towing vehicle where the towing assistance apparatus according to the embodiment is mounted and the towed vehicle.

FIG. 1 is a side view illustrating a towing vehicle 10 where a towing assistance apparatus according to an embodiment is mounted and a towed vehicle 12 towed by the towing vehicle 10. In FIG. 1, a left-hand side is set to a front based on the towing vehicle 10 and a right-hand side is set to a rear based on the towing vehicle 10. FIG. 2 is a top view of the towing vehicle 10 and the towed vehicle 12 illustrated in FIG. 1.

The towing vehicle 10 may be an automobile including an internal combustion engine (engine) as a driving source (i.e., an internal combustion engine automobile), an automobile including an electric motor (motor) as a driving source (i.e., an electric automobile and a fuel cell automobile, for example), or an automobile including both the engine and the motor as a driving source (i.e., a hybrid automobile). The towing vehicle 10 may be a Sport Utility Vehicle (SUV) as illustrated in FIG. 1 or a so-called "pickup truck" in which a loading platform is provided at a rear portion of the vehicle. The towing vehicle may be a general passenger automobile. The towing vehicle 10 may include any types of transmission devices and any types of devices (including systems and components, for example) for driving the internal combustion engine and the electric motor. A system, the number, and a layout, for example, of a device related to driving of wheels 14 (front wheels 14F and rear wheels 14R) of the towing vehicle 10 may be appropriately employed or specified.

A towing device 18 (a hitch) for towing the towed vehicle 12 protrudes from a lower portion of a rear bumper 16a of the towing vehicle 10 so as to be positioned substantially at a center of the rear bumper 16a in a vehicle width direction thereof. The towing device 18 is fixed to a frame of the towing vehicle 10, for example. As an example, the towing device 18 includes a spherical hitch ball 18a at a distal end portion which is erected in a vertical direction (i.e., up and down direction of the towing vehicle 10). A coupler 20a provided at a distal end portion of a connection member 20 which is fixed to the towed vehicle 12 covers the hitch ball 18a. As a result, the towing vehicle 10 and the towed vehicle 12 are coupled and connected to each other, and the towed vehicle 12 may swing (turn) in the vehicle width direction relative to the towing vehicle 10. That is, the hitch ball 18a transmits forward, rearward, leftward, and rightward movements to the towed vehicle 12 (the connection member 20), and receives power of acceleration and/or deceleration.

As illustrated in FIG. 1, the towed vehicle 12 may be a box type including at least one of a boarding space, a living area and a storage space, for example, or a loading platform type for mounting a package (for example, a container or a boat). In addition, for example, the towed vehicle 12 includes a pair of trailer wheels 22. The towed vehicle 12 illustrated in FIG. 1 is a driven vehicle including driven wheels, not including a driving wheel or a steering wheel.

The towing vehicle 10 is equipped with plural imaging units 24, for example, four imaging units 24a, 24b, 24c, and 24d, imaging surroundings of the towing vehicle 10. For example, each of the imaging units 24 is a digital camera incorporating imaging elements such as a Charge Coupled Device (CCD) and a CMOS Image Sensor (CIS). The imaging unit 24 outputs moving image data (captured image data) at a predetermined frame rate. The imaging unit 24 has a wide-angle lens or a fisheye lens and may photograph a range of, for example, 140° to 220° in a horizontal direction.

The imaging unit 24a is provided at a wall portion below a rear window of a rear hatch 10a at a rear side of the towing vehicle 10. An optical axis of the imaging unit 24a is set obliquely downward. Therefore, the imaging unit 24a successively captures a rear image including a rear region of the towing vehicle 10 (for example, see a range indicated by a two-dotted chain line in FIG. 1) including a rear end portion of the towing vehicle 10, the connection member 20, and at least a front end portion of the towed vehicle 12 and outputs the aforementioned image as captured image data. The captured image data obtained by the imaging unit 24a that includes the rear region may be employed for detection of a connection state of the towing vehicle 10 and the towed vehicle 12 (for example, a connection angle there between and whether or not the towed vehicle 12 is connected to the towing vehicle 10). In this case, because the connection state or the connection angle of the towing vehicle 10 relative to the towed vehicle 12 is acquired on a basis of the captured image data acquired by the imaging unit 24a, a system configuration may be simplified.

The imaging unit 24b is provided at a door mirror 10b at a right end portion of the towing vehicle 10, for example. The imaging unit 24b successively captures a right-side image (side image, lateral image) including a right-side region (lateral region) of the towing vehicle 10 and outputs the aforementioned image as the captured image data. The right-side image includes a right rear region of the towing vehicle 10 so that a right side surface, for example, of the towed vehicle 12 connected to the towing vehicle 10 is included in an image captured region. Thus, the imaging unit 24b may image (capture) an operation of the towed vehicle 12 in a case where the towed vehicle 12 turns rightward and a positional relation with an object in surroundings of the towing vehicle 10, for example.

In the same manner, the imaging unit 24c is provided at a door mirror 10c at a left end portion of the towing vehicle 10, for example. The imaging unit 24c successively captures a left-side image (side image, lateral image) including a left-side region (lateral region) of the towing vehicle 10 and outputs the aforementioned image as the captured image data. The left-side image includes a left rear region of the towing vehicle 10 so that a left side surface, for example, of the towed vehicle 12 connected to the towing vehicle 10 is included in an image captured region. Thus, the imaging unit 24c may image an operation of the towed vehicle 12 in a case where the towed vehicle 12 turns leftward and a positional relation with an object in surroundings of the towing vehicle 10, for example.

The imaging unit 24d is provided at a front portion of the towing vehicle 10, i.e., at a front bumper 16b which is arranged at a front end portion of the towing vehicle 10 in a front-rear direction thereof. The imaging unit 24d successively captures a front image including a front region of the towing vehicle 10 and outputs the aforementioned image as the captured image data. The front image may be utilized for displaying a state in front of the towing vehicle 10 and/or an estimated locus of the towing vehicle 10, for example.

The imaging units 24 are arranged in a manner that a part of an image captured region of each one of the imaging units 24 and a part of an image captured region of each one of the other imaging units 24 adjacent to each other overlap, so that the captured image data which covers entire surroundings of the towing vehicle 10 is acquired by the imaging units 24. Various arithmetic operations and image processing are performed on the captured image data obtained by the imaging units 24 so that the captured image data is output as an image which is easily viewable and which includes a wider view angle. In addition, the respective captured image data as three-dimensional (3D) data is converted to two-dimensional (2D) data and joined to one another so as to be further converted to a simple overhead view image where the towing vehicle 10 is looked down from above.

As illustrated in FIG. 2, the towing vehicle 10 includes plural distance measuring units 26, 28. Specifically, the towing vehicle 10 includes four distance measuring units 26a, 26b, 26c and 26d, and eight distance measuring units 28a, 28b, 28c, 28d, 28e, 28f, 28g and 28h, for example. Each of the distance measuring units 26 and 28 is a sonar (a sonar sensor or an ultrasonic detector) emitting ultrasonic wave and capturing a reflected wave, for example. For example, in a case where the towed vehicle 12 is not connected to the towing vehicle 10, whether or not an object is positioned in the surroundings of the towing vehicle 10 and a distance (position) to such object are detectable or measurable on a basis of detection results of the distance measuring units 26 and 28. The distance measuring unit 28 is used for detecting an object at a relatively short distance, for example. The distance measuring unit 26 is used for detecting an object at a relatively long distance as compared to the distance measuring unit 28, for example. The distance measuring unit 28 is used for detecting an object positioned ahead and behind the towing vehicle 10, for example. The distance measuring unit 26 is used for detecting an object laterally positioned relative to the towing vehicle 10, for example. In a case where it is detected that an object approaches within a predetermined distance from the towing vehicle 10 based on the detection results of the distance measuring units 26 and 28, presence and approach of such object is informed or alerted to the driver via turning-on of a warning light or output of warning sound, for example.

Figure 3:
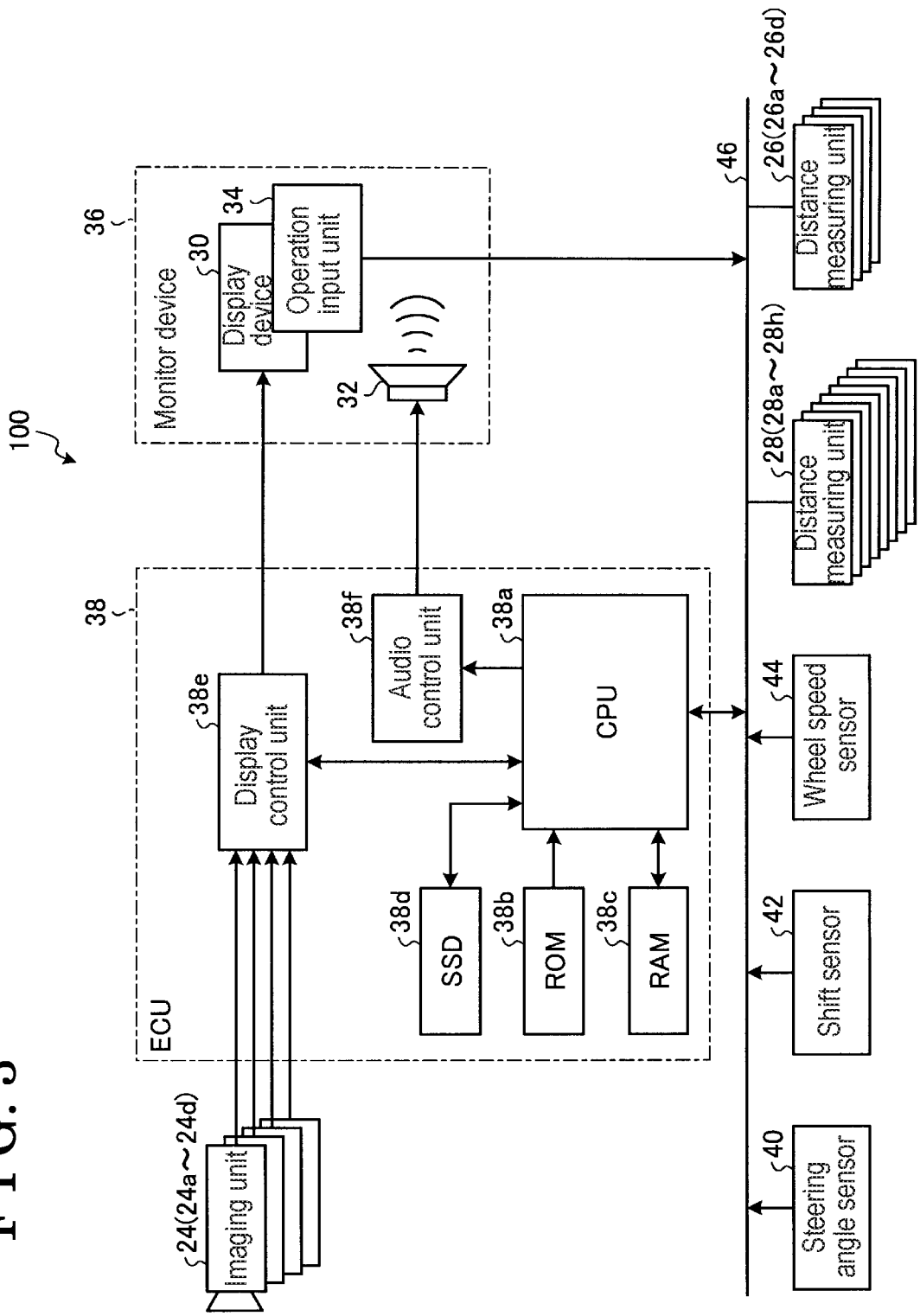
FIG. 3 is a block diagram illustrating a configuration of a towing assistance system including the towing assistance apparatus according to the embodiment.
Figure 4:
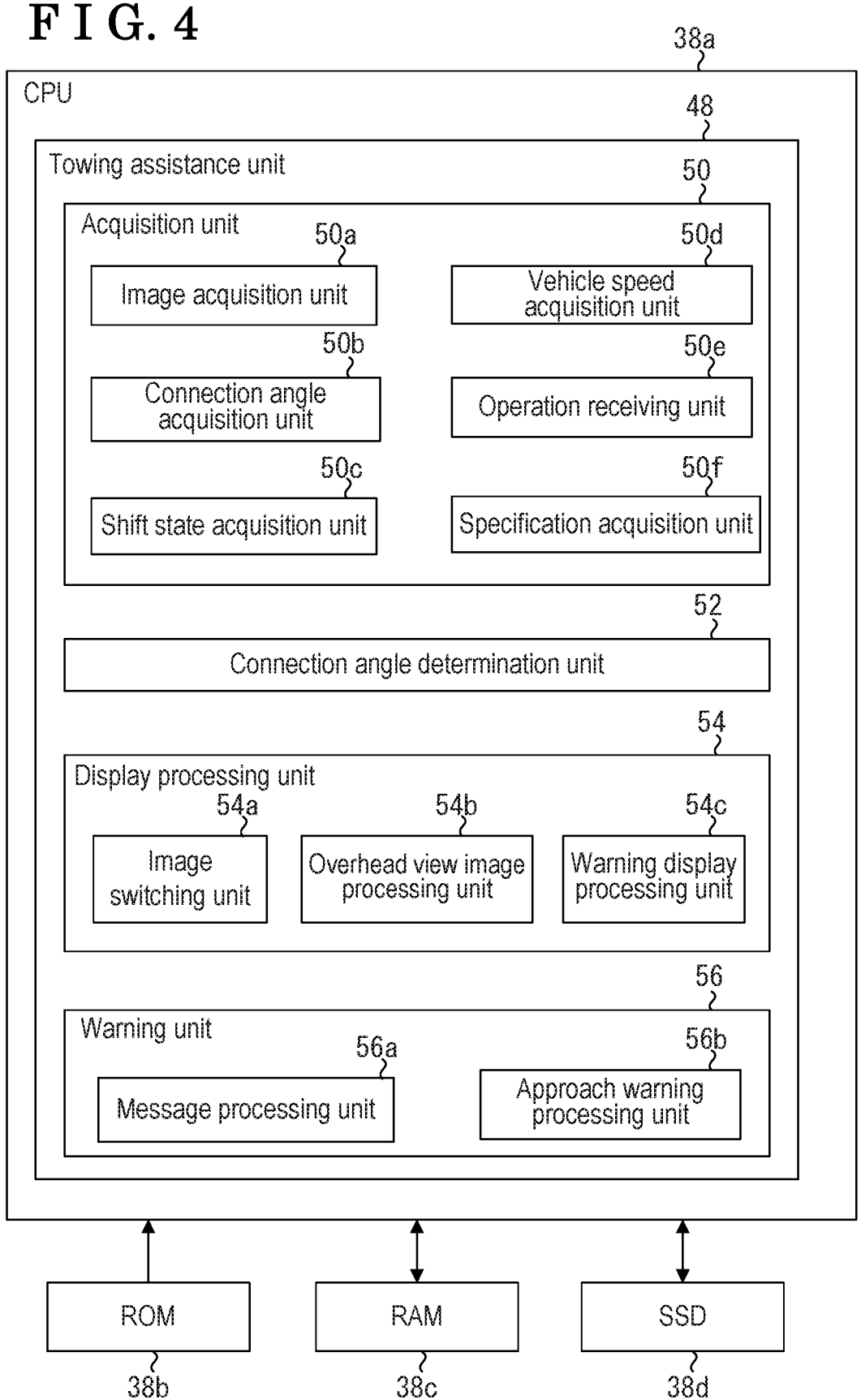
FIG. 4 is a block diagram obtained in a case where the towing assistance apparatus according to the embodiment is realized on a CPU.

FIG. 3 is a block diagram illustrating a configuration of a towing assistance system 100 including the towing assistance apparatus according to the embodiment.

As illustrated in FIG. 3, a display device 30 (a display unit) and an audio output device 32, for example, are provided at an interior (vehicle interior) of the towing vehicle 10. The display device 30 is a Liquid Crystal Display (LCD) or Organic Electroluminescent Display (OELD), for example. The audio output device 32 is a speaker, for example. In the embodiment, the display device 30 is covered with a transparent operation input unit 34 (for example, a touch panel), for example. A driver (user) may visually recognize a picture (image) displayed on a screen of the display device 30 via the operation input unit 34. The driver touches, pushes, or moves the operation input unit 34 with a finger, for example, at a position corresponding to the picture (image) displayed on the screen of the display device 30, so that an operation input (instruction input) may be executed. In the embodiment, for example, the display device 30, the audio output device 32, and the operation input unit 34, for example, are provided at a monitor device 36 positioned at a center portion of a dashboard in the vehicle width direction (right and left direction). The monitor device 36 may include an operation input unit such as a switch, a dial, a joystick, and a push button, for example. In addition, another audio output device may be provided at a position in the vehicle interior different from the position where the monitor device 36 is arranged. Another audio output device which is different from the audio output device 32 at the monitor device 36 may output sound. In the embodiment, the monitor device 36 is shared with a navigation system and an audio system, for example. Instead, a monitor device for a towing assistance apparatus may be provided separately from the aforementioned systems.

According to the towing assistance system 100, a display content displayed at the display device 30 is changeable or switchable depending on the connection angle between the towing vehicle 10 and the towed vehicle 12 in a state where the towed vehicle 12 is connected to the towing vehicle 10. For example, during the rearward driving of the towing vehicle 10 to which the towed vehicle 12 is connected, the towed vehicle 12 may be greatly turned (tilted) relative to the towing vehicle 10 at the connection portion therewith (i.e., at the position of the towing device 18) resulting from the connection angle between the towing vehicle 10 and the towed vehicle 12. In this case, the connection angle is changeable (correctable) by steering during the rearward driving of the towing vehicle 10. Nevertheless, in a case where the connection angle reaches or exceeds a certain angle (i.e., a first angle), the connection angle is impossible to be changed to decrease, i.e., the towed vehicle 12 is brought to a jackknife condition. The first angle may be ±45° in the vehicle width direction relative to the front-rear direction of the towing vehicle 10 (for example, a vehicle center axis N (see FIG. 2) in the front-rear direction of the towing vehicle 10) at the position of the towing device 18. According to the towing assistance system 100, the connection angle is acquired, and, in a case where the connection angle reaches or exceeds the first angle so that the jackknife condition is established, the rear image captured by the imaging unit 24a is automatically displayed at the display device 30 as a surrounding image of the towing vehicle 10 by which a positional relation between the towing vehicle 10 and the towed vehicle 12 is most understandable. In addition, in order to cause the driver to recognize that the jackknife condition is established, any alert (warning) may be output by means of the display device 30 or the audio output device 32, or highlight display may be conducted by the display device 30, for example, so that the driver is alerted to danger.

Regardless of whether or not the towed vehicle 12 is connected to the towing vehicle 10, the rear image captured by the imaging unit 24a is displayed at the display device 30 in a case where the towing vehicle 10 is shifted to a rearward driving available state from a state other than the rearward driving available state such as a forward driving available state, a neutral state, and a parking state, for example. That is, according to the towing assistance system 100, the surrounding image indicating an initial state at the time the rearward driving is started is displayed so that the driver can recognize a positional relation between the towing vehicle 10 and the towed vehicle 12.

In a case where the connection angle changes during the rearward driving of the towing vehicle 10 and reaches or exceeds a second angle that is smaller than the first angle (at which the jackknife condition is established), the display at the display device 30 is automatically changed to the side image (lateral image). The second angle may be ±5° in the vehicle width direction relative to the front-rear direction of the towing vehicle 10 (for example, the vehicle center axis N (see FIG. 2) in the front-rear direction of the towing vehicle 10) at the position of the towing device 18. In this case, because the side image is automatically displayed, the operation (position) of the towed vehicle 12 in a state where a turning angle of the towed vehicle 12 is relatively small is easily understandable. In addition, because the display content of the display device 30 is switched, it is easily recognizable that the positional relation between the towing vehicle 10 and the towed vehicle 12 is changed. In this case, the towing assistance apparatus 100 detects a direction where the towed vehicle 12 is turning relative to the front-rear direction of the towing vehicle 10 and displays the side image in a direction same as the turning direction of the towed vehicle 12. In another embodiment, in a case where the rear image is displayed during the rearward driving of the towing vehicle 10, the display may be switched to the side image at a desired timing by the driver operating the operation input unit 34, for example. In addition, in a case where the side image is displayed during the rearward driving of the towing vehicle 10, the display may be switched to the rear image by the operation of the driver. As a result, the position to which the driver desires to pay attention may be smoothly confirmed.

In a case where the connection angle reaches the first angle (at which the jackknife condition is established), the rear image by which the positional relation between the towing vehicle 10 and the towed vehicle 12 is most understandable is again automatically displayed. That is, the positional relation between the towing vehicle 10 and the towed vehicle 12 is again recognized by the driver so that the driver clearly acknowledges that further rearward driving may cause a contact (collision) between the towing vehicle 10 and the towed vehicle 12, i.e., clearly acknowledges increase of risk.

In order to achieve the switching of the display content based on the aforementioned connection angle, an electronic control unit (ECU) 38, a steering angle sensor 40, a shift sensor 42, a wheel speed sensor 44, and the distance measuring units 26, 28, for example, in addition to the monitor device 36, are electrically connected to one another via an in-vehicle network 46 serving as an electrical communication line. The in-vehicle network 46 is configured as a controller area network (CAN), for example. The EU 38 receives, via the in-vehicle network 46, detection results of the steering angle sensor 40, the shift sensor 42, the wheel speed sensor 44, and the distance measuring units 26, 28 and an operation signal of the operation input unit 34, for example, and reflects the aforementioned detection results and the operation signal to the control.

The ECU 38 includes a central processing unit (CPU) 38a, a read only memory (ROM) 38b, a random access memory (RAM) 38c, a solid state drive (SSD) (flash memory) 38d, a display control unit 38e, and an audio control unit 38f, for example. The CPU 38a performs a display processing related to the image displayed at the display device 30, a recognition (detection) processing of the towed vehicle 12 connected to the towing vehicle 10, and a detection processing of the connection angle between the towing vehicle 10 and the towed vehicle 12, for example, and performs switching of the display content of the display device 30 based on the connection angle.

The CPU 38a reads out program installed and stored at a non-volatile storage unit such as the ROM 38b, for example, and performs an arithmetic processing based on such program. The RAM 38c tentatively stores various data used for calculation at the CPU 38a. The display control unit 38e provides the captured image data acquired by the imaging units 24 (the imaging units 24a to 24d) to the CPU 38a and mainly performs synthesis of image data displayed at the display device 30 among the arithmetic processing performed at the ECU 38. The audio control unit 38f mainly performs a processing of audio data output from the audio output device 32 among the arithmetic processing performed at the ECU 38. The SSD 38d that is a rewritable non-volatile storage unit is able to store data even when a power source of the ECU 38 is turned off. The CPU 38a, the ROM 38b, and the RAM 38c, for example, may be integrated within the same package. The ECU 38 may be constructed to use another arithmetic logic processor or logic circuit such as a digital signal processor (DSP), for example, instead of the CPU 38a. In addition, a hard disk drive (HDD) may be provided instead of the SSD 38d, or the SSD 38d and the HDD may be provided separately from the ECU 38, for example.

The steering angle sensor 40 detects a steering amount of a steering portion such as a steering wheel of the towing vehicle 10 (i.e., a steering angle of the towing vehicle 10), for example. The steering angle sensor 40 is constructed to use a Hall element, for example. The ECU 38 acquires the steering amount of the steering portion by the driver and the steering amount of each wheel 14 during automatic steering state from the steering angle sensor 40 to perform various controls, for example. The steering angle sensor 40 detects a rotation angle of a rotation portion included in the steering portion. A detection signal output from the steering angle sensor 40 may be employed as an intention signal indicating that the driver intends to drive and operate the towing vehicle 10. As mentioned above, according to the towing assistance system 100, the rear image captured by the imaging unit 24a is displayed at the display device 30, regardless of whether or not the towed vehicle 12 is connected to the towing vehicle 10, in a case where the towing vehicle 10 is shifted to the rearward driving available state from the forward driving available state, for example. An output signal from the steering angel sensor 40 indicating that the towing vehicle 10 is steered may be utilized as a permission signal for displaying the other image.

The shift sensor 42 detects a position of a movable portion of a shift operating portion (for example, a shift lever). The shift sensor 42 may detect a position of a lever, an arm or a button, for example, serving as the movable portion. The shift sensor 42 may include a displacement sensor or may be configured as a switch. The towing assistance system 100 may acquire whether the present state of the towing vehicle 10 is the forward driving available state or the rearward driving available state based on information from the shift sensor 42 in a case of detecting the connection angle between the towing vehicle 10 and the towed vehicle 12. In addition, the towing assistance system 100 may use a signal indicating a shift position (shift state) "R" obtained by the shift sensor 42 as a trigger for starting a towing assistance processing.

The wheel speed sensor 44 detects a rotation amount of the wheel 14 and the number of rotations (rotation speed) of the wheel 14 per unit time. The wheel speed sensor 44 is disposed at each of the wheels 14 and outputs the number of wheel speed pulses indicating the rotation speed detected at each of the wheels 14 as a sensor value. The wheel speed sensor 44 may be configured by using, for example, a Hall element. The ECU 38 calculates whether or not the towing vehicle 10 moves, and an amount of movement of the towing vehicle 10, for example, based on the sensor value acquired from the wheel speed sensor 44 and executes the various controls.

The configuration, arrangement, and electric connection state, for example, of each of the aforementioned sensors are examples and may be appropriately specified and changed.

The CPU 38a reads out and executes program installed and stored at the storage unit such as the ROM 38b, for example, so as to realize a towing assistance unit 48 and performs a display switching processing and a warning processing for informing and warning the driver about the establishment of the jackknife condition. The towing assistance unit 48 includes an acquisition unit 50, a connection angle determination unit 52, a display processing unit 54, and a warning unit 56, for example, as specific modules for performing the display switching processing and the warning processing.

The acquisition unit 50 serves as a module for acquiring various information to perform the display switching processing and the warning processing and includes an image acquisition unit 50a, a connection angle acquisition unit 50b serving as an angle acquisition unit, a shift state (shift position) acquisition unit 50c, a vehicle speed acquisition unit 50d, an operation receiving unit 50e, and a specification acquisition unit 50f, for example.

The image acquisition unit 50a at least acquires image information necessary for displaying surrounding circumstances of the towing vehicle 10 in a case where the towing assistance system 100 is operating. For example, the image acquisition unit 50a acquires plural captured image data (for example, data of front image, left-side image, right-side image and rear image) from the imaging units 24a to 24d imaging surroundings of the towing vehicle 10. The acquired images are successively displayed at the display device 30 as actual images without change or are successively displayed at the display device 30 as overhead view images after being converted to 2D data from 3D date.

The connection angle acquisition unit 50b may specify an angle of the connection member 20 shifted in the vehicle width direction relative to the front-rear direction of the towing vehicle 10 (for example, a center axis of the towing vehicle 10 in the front-rear direction thereof) at the position of the towing device 18 as a connection angle θ, for example. A straight line passing through the coupler 20a is detected in the rear image based on the captured image data by the imaging unit 24a from among straight lines extending in the front-rear direction of the towed vehicle 12 at the connection member 20. The aforementioned detected straight line is specified as a connection center axis M of the connection member 20 as illustrated in FIG. 2. Because the vehicle center axis N of the towing vehicle 10 in the image captured by the imaging unit 24a is known, the connection angle θ is detectable on a basis of the vehicle center axis N and the connection center axis M. In the present embodiment, the imaging unit 24a is arranged substantially directly above the towing device 18, i.e., arranged coaxially with the vehicle center axis N. That is, the connection member 20 can be looked down from substantially right above, so that the connection angle θ formed between the vehicle center axis N and the connection center axis M is easily detectable. On the other hand, the imaging unit 24a may be possibly not arranged directly above the towing device 18 because of the configuration of the towing vehicle 10 or other reasons. For example, the imaging unit 24a may be arranged at a position displaced rightward or leftward from a center of the rear hatch 10a. In this case, a 2D coordinate of the rear image captured by the imaging unit 24a is converted to a 3D coordinate based on above-ground height of the towing device 18 (hitch ball 18a) (which is a known value according to a specification document, for example) so as to detect the connection angle θ based on the vehicle center axis N and the connection center axis M. In another embodiment, the connection angle acquisition unit 50b may detect the connection angle θ by analyzing the image of a marker attached to a front wall surface of the connection member 20 or the towed vehicle 12.

In another embodiment, an angle sensor may be provided at the towing device 18 or in the vicinity thereof to detect an angle of the connection member 20 relative to the towing device 18, and the detected angle may be specified as the connection angle θ. In this case, a processing load of the CPU 38a may decrease.

The shift state acquisition unit 50c acquires whether the towing vehicle 10 is in the forward driving available state or the rearward driving available state based on the position of the movable portion of the shift operating portion output from the shift sensor 42. In a case where the shift state acquisition unit 50c acquires a signal indicating that the position of the movable portion is shifted to "R" range from the other range (such as "P", "N", or "D" range), the acquisition unit 50 considers that the driver intends to drive rearward. In this case, the towing assistance unit 48 ensures a rear view to the driver, i.e., switches the display content of the display device 30 to the rear image so that the driver may pay attention to the rear region of the towing vehicle 10. Details of switching the display of the display device 30 are explained later.

The vehicle speed acquisition unit 50d acquires a vehicle speed of the towing vehicle 10 (the towed vehicle 12) based on a sensor value provided from the wheel speed sensor 44 (for example, an integrated value of wheel speed pulse numbers). In another embodiment, the vehicle speed may be calculated on a basis of the image (the front image, the side image, and the rear image, for example) captured by the imaging unit 24 which is acquired by the image acquisition unit 50a. Accordingly, the vehicle speed acquisition unit 50d acquires own vehicle movement information indicating that the towing vehicle 10 is moving. The vehicle speed (own vehicle movement information) may be utilized for a processing to output different kind of warning in a case where the towing vehicle 10 is further driven rearward after the jackknife condition is established.

The operation receiving unit 50e acquires input information input by the driver in a case where the acquisition unit 50 performs image display for towing assistance, for example. The operation receiving unit 50e acquires operation information input via the operation input unit 34 in a case where the display content displayed at the display device 30 is changed due to the intention of the driver.

The specification acquisition unit 50f acquires specifications of the towed vehicle 12. The angle (first angle) at which the jackknife condition is established differs depending on a length of a wheel base of the towed vehicle 12. The towed vehicle 12 of various kinds of specifications is connectable to the towing vehicle 10. The length of the wheel base of the towed vehicle 12 differs depending on specifications thereof. Thus, the specification acquisition unit 50f acquires the length of the wheel base of the towed vehicle 12 connected to the towing vehicle 10 based on direct input by the driver via the operation input unit 34, for example. The length of the wheel base of the towed vehicle 12 may be acquired by a specification document of the towed vehicle 12, for example. In a case where the towing assistance unit 48 includes a recognition unit which automatically recognizes a type of the towed vehicle 12 connected to the towing vehicle 10, for example, the specification acquisition unit 50f may automatically acquire the specifications of the towed vehicle 12 at the time the towed vehicle 12 is connected to the towing vehicle 10.

The connection angle determination unit 52 determines, on a basis of the connection angle θ acquired by the connection angle acquisition unit 50b, whether or not the present connection angle between the towing vehicle 10 and the towed vehicle 12 reaches or exceeds the first angle (i.e., the angle at which the jackknife condition is established) at which a change control to decrease the connection angle is impossible by the steering during the rearward driving of the towing vehicle 10. As mentioned above, the first angle differs depending on the length of the wheel base of the towed vehicle 12. Thus, the connection angle determination unit 52 acquires the first angle conforming to the length of the wheel base acquired by the specification acquisition unit 50*f* from the storage unit such as the ROM 38*b*, for example. Alternatively, the first angle for the towed vehicle 12 connected to the towing vehicle 10 may be directly selected via input by the driver at the display device 30, for example. The connection angle determination unit 52 determines whether or not the connection angle acquired by the connection angle acquisition unit 50*b* reaches or exceeds the second angle that is smaller than the first angle. The second angle is an angle of range before the connection angle reaches the first angle, i.e., an angle of range where the change control to decrease the connection angle of the towed vehicle 12 relative to the towing vehicle 10 is capable by the steering during the rearward driving of the towing vehicle 10. The second angle is a reference angle in a case where the direction (posture) of the towed vehicle 12 is confirmed by the side image instead of the rear image. Therefore, the first angle serves as an angle by which the driver may easily recognize that the jackknife condition is satisfied. The first angle is determinable on a basis of the length of the wheel base of the towed vehicle 12 as mentioned above while the second angle is determinable beforehand. The second angle may be also determined on a basis of a type of the towing vehicle 10 or may be appropriately changed by the driver depending on a rear view of the towing vehicle 10.

The display processing unit 54 performs a processing for changing the display content of the display device 30 based on a determination result of the connection angle by the connection angle determination unit 52. In order to perform the aforementioned change processing, the display processing unit 54 includes modules such as an image switching unit 54*a*, an overhead view image processing unit 54*b*, and a warning display processing unit 54*c*, for example. The warning unit 56 performs a processing for determining a warning content which is displayed by the warning display processing unit 54*c*. The warning unit 56 mainly warns the establishment of jackknife condition, i.e., warns that the change control for decreasing the connection angle is impossible by the steering during the rearward driving of the towing vehicle 10, in a case where the connection angle reaches the first angle. The warning unit 56 includes a message processing unit 56*a* and an approach warning processing unit 56*b*, for example, as modules for determining the warning content.

In a case where it is determined that the towing vehicle 10 to which the towed vehicle 12 is connected is shifted to the rearward driving available state based on the shift state (shift position) acquired by the shift state acquisition unit 50*c*, the image switching unit 54*a* displays the rear image based on the captured image data obtained by the imaging unit 24*a* as the surrounding image. The rearward driving available state corresponds to a state where the shift operating unit is operated by the driver and the shift state is shifted to "R" range, for example. Whether or not the rearward driving has started is not necessary for satisfying the rearward driving available state. In a case where an automatic driving is available, the rearward driving available state corresponds to a state where the shift state is automatically shifted to "R" range for the rearward driving.

The image switching unit 54*a* switches the surrounding image which is displayed at the display device 30 to the side image showing an inner side of turning of the towed vehicle 12 in a case where the connection angle becomes equal to or greater than the second angle that is smaller than the first angle at which the jackknife condition is established. The side image at this time is based on the captured image data obtained by the imaging unit 24*b* or the imaging unit 24*c* positioned in a turning direction of the towed vehicle 12 and is determined on a basis of the connection angle acquired by the connection angle acquisition unit 50*b*.

The image switching unit 54*a* switches the surrounding image displayed at the display device 30 to the rear image based on the captured image data captured by the imaging unit 24*a* in a case where the connection angle reaches the first angle. In this case, the image switching unit 54*a* may display, as the rear image for display, the rear image in a different mode from the rear image which is displayed in a case where the towing vehicle 10 is shifted to the rearward driving available state. For example, while the rear image displayed in a case where the towing vehicle 10 is shifted to the rearward driving available state may be referred to as a normal rear image, the rear image displayed in a case where the connection angle reaches the first angle may be referred to as a wide rear image. The wide rear image is obtained by widening a display region of the normal rear image in the vehicle width direction so that the towed vehicle 12 is easily recognizable in a case where the towed vehicle 12 moves in the vehicle width direction by greatly turning relative to the towing vehicle 10 as in the jackknife state.

The overhead view image processing unit 54*b* performs known 2D conversion processing, distortion correction processing, brightness control processing, and joining processing, for example, on the captured image data in each direction (front, rear, left, or right direction) acquired by the image acquisition unit 50*a* so as to generate an overhead view image where the towed vehicle 12 is looked down from above, for example. In a case where the imaging units 24 are arranged at an outer peripheral portion of the towing vehicle 10 as illustrated in FIG. 2, only a part of the towing vehicle 10 is captured in each of the captured image data, so that a complete overhead view image of the towing vehicle 10 is inhibited from being generated. Thus, the overhead view image processing unit 54*b* reads out an own vehicle icon corresponding to the own vehicle (towing vehicle 10) and stored beforehand at the ROM 38*b* or the SSD 38*d* and superimposes the own vehicle icon on a corresponding region in the generated overhead view image. In the same manner, only a part of the towed vehicle 12 is captured in the captured image data of each side image and rear image, so that a complete overhead view image of the towed vehicle 12 is inhibited from being generated. Thus, the overhead view image processing unit 54*b* reads out a trailer icon corresponding to the towed vehicle 12 and superimposes the trailer icon on a corresponding region in the generated overhead view image. As mentioned above, the towed vehicle 12 of various types (modes) is connectable to the towing vehicle 10. Thus, the ROM 38*b* or the SSD 38*d* may store trailer icons of various modes so that the overhead view image processing unit 54*b* may select one of the trailer icons conforming to the towed vehicle 12 connected to the towing vehicle 10. Alternatively, regardless of the mode of the towed vehicle 12, a representative trailer icon may be displayed.

In a case where the content of image displayed at the display device 30 is switched by the image switching unit 54*a*, the warning display processing unit 54*c* performs a processing for providing a message corresponding to the switched content of image to be superimposed on the display image.

The display image such as the message displayed and superimposed by the warning display processing unit 54c, for example, is determined by the warning unit 56. The warning unit 56 includes modules such as the message processing unit 56a and the approach warning processing unit 56b, for example.

The message processing unit 56a reads out an explanatory message corresponding to the image content which is switched by the image switching unit 54a mainly at the time of towing assistance, from the ROM 38b or the SSD 38d, for example. For example, a message indicating the type of the image (the rear image or the side image) presently displayed and an attention message to the present state are read out, for example.

The approach warning processing unit 56b acquires information indicating an approaching state of the towed vehicle 12 relative to the towing vehicle 10 by means of the distance measuring units 26 and 28 (for example, the distance measuring units 28a to 28d) in a case where the towed vehicle 12 is connected to the towing vehicle 10. As mentioned above, each of the distance measuring units 26 and 28 detects an object which approaches the towing vehicle 10 and a distance to such object. That is, identification of the object is not conducted. Thus, in a case where the towed vehicle 12 is connected to the towing vehicle 10, the distance measuring units 28a to 28d detect and identify the towed vehicle 12 as the object approaching the towing vehicle 10 and keep outputting an approach warning. Thus, in a case where the connection angle is acquired by the connection angle acquisition unit 50b, i.e., it is confirmed that the towed vehicle 12 is connected to the towing vehicle 10, for example, the approach warning processing unit 56b partially invalidates the warning based on the detection results of the distance measuring units 28a to 28d arranged at positions facing the towed vehicle 12. That is, the towed vehicle 12 connected to the towing vehicle 10 is inhibited from being regarded as the object approaching the towing vehicle 10. At this time, however, the distance to the towed vehicle 12 is measured by the distance measuring units 28a to 28d. The relative distance of the towed vehicle 12 relative to the towing vehicle 10 in a case where the connection angle reaches the first angle (at which the jackknife condition is satisfied) may be calculated beforehand. Thus, in a case where the relative distance of the towed vehicle 12 relative to the towing vehicle 10 in a state where the towed vehicle 12 is connected to the towing vehicle 10 becomes equal to or smaller than a relative distance obtained under the jackknife condition, an output signal of the distance measuring unit 28 is utilized as a detection signal of the jackknife condition. In this case, a display used for approach warning based on the detection signals of the distance measuring units 26 and 28 (i.e., an indicator, for example) in a state where the towed vehicle 12 is not connected to the towing vehicle 10 may be used as a warning indicator at the time the jackknife condition is detected. The approach warning processing unit 56b may perform a processing for strengthen an alarm indicating the establishment of the jackknife condition in a stepwise manner based on acquisition information of the shift state acquisition unit 50c and the vehicle speed acquisition unit 50d in a case where the rearward driving (rearward speed) is confirmed even after the jackknife condition is established.

Figure 5:
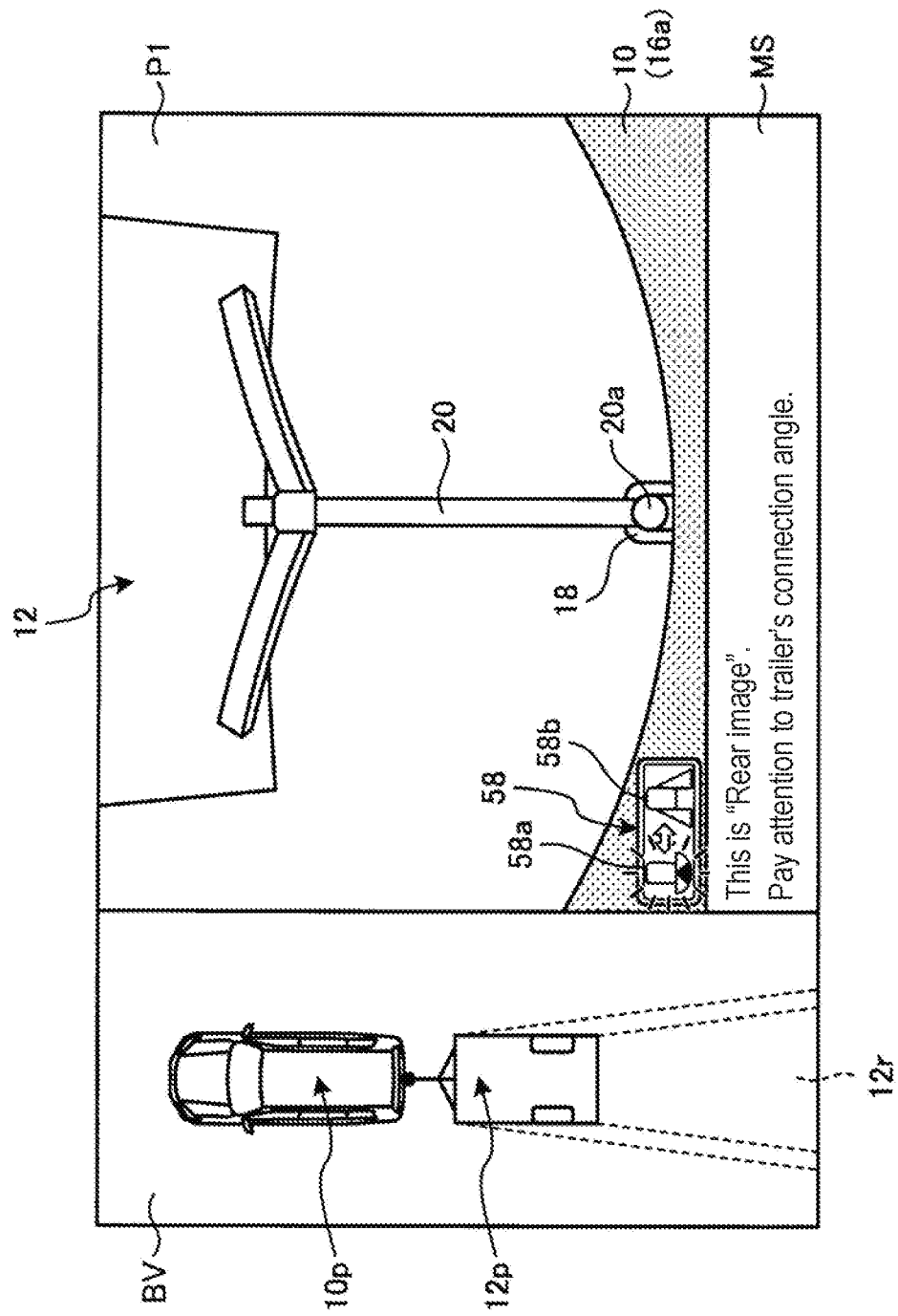
FIG. 5 is a schematic view illustrating examples of a rear image and an overhead view image displayed in a case where the towing vehicle to which the towed vehicle is connected is shifted to a rearward driving available state.

FIGS. 5 to 8 schematically illustrate display examples displayed at the display device 30 according to the towing assistance system 100 (the display processing unit 54). FIG. 5 is a schematic view of a display where a rear image P1 and an overhead view image BV are arranged side by side in a case where the towing vehicle 10 to which the towed vehicle 12 is connected is in the rearward driving available state.

As mentioned above, in a case where the towing vehicle 10 to which the towed vehicle 12 is connected is in the rearward driving available state, the display of the display device 30 is automatically switched to the image including the rear image so that the positional relation between the towing vehicle 10 and the towed vehicle 12 at the time the rearward driving is started is easily understandable. For example, in a case where the towing vehicle 10 is in a state other than the rearward driving available state (i.e., the shift position is in "D" range, "N" range, or "P" range, for example), a navigation screen or an audio screen is displayed as a normal display screen (i.e., a normal image) at the display device 30. In a case where the shift position of the towing vehicle 10 is shifted to "R" range with which the rearward driving is available, the rear image is displayed at the display device 30 so as to encourage the driver to pay attention to the rear region of the towing vehicle 10.

Figure 6:
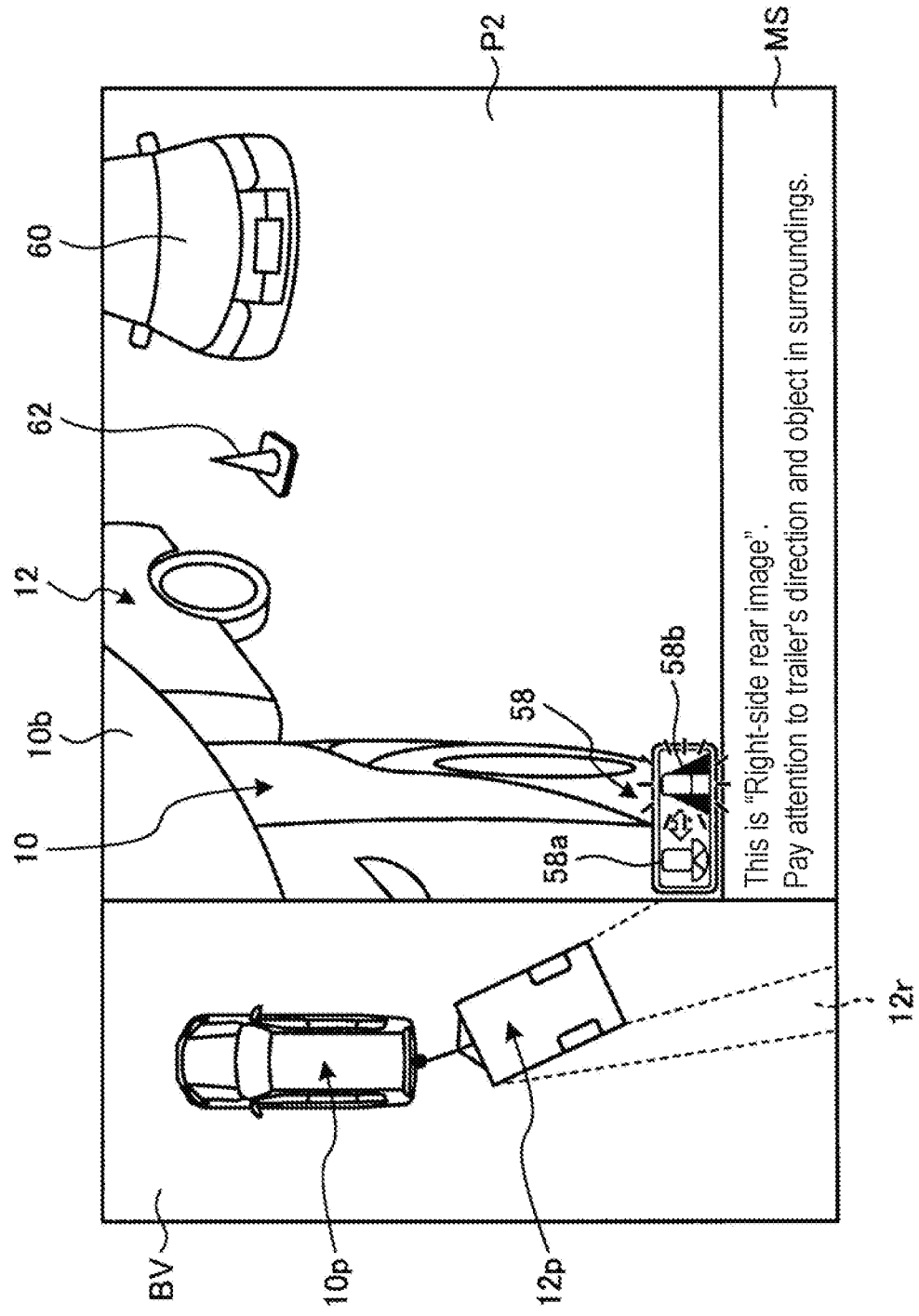
FIG. 6 is a schematic view illustrating an example of a side image and the overhead view image displayed in a case where a connection angle between the towing vehicle and the towed vehicle reaches or exceeds a second angle in a state where the towing vehicle to which the towed vehicle is connected is in the rearward driving available state.

The rear image P1 illustrated in FIG. 5 serves as a normal rear image where a width of a display region in the vehicle width direction is a normal width. In the rear image P1, each of the towing device 18 positioned substantially at a center of the rear bumper 16a of the towing vehicle 10 and the connection member 20 (the coupler 20a) which extends towards the towing vehicle 10 from the towed vehicle 12 is displayed in a certain size so as to be easily recognized. As a result, an initial connection state between the towing vehicle 10 and the towed vehicle 12 (i.e., initial directions or postures thereof) is easily recognized. In addition, a switching icon 58 is displayed at a part of the rear image P1. The switching icon 58 indicates a function of the operation input unit 34 via which the display image is switched to the side image from the rear image P1 that is automatically displayed when the towing vehicle 10 is shifted to the rearward driving available state. In FIG. 5, the switching icon 58 constituted a rear designation icon 58a and a side designation icon 58b is displayed in a manner that the rear designation icon 58a indicating that the rear image is effective is turned on while the side designation icon 58b indicating that the side image is effective is turned off. Each time the driver touches the switching icon 58, turning-on and turning-off of the rear designation icon 58a and the side designation icon 58b are switched. The rear image P1 displayed as the initial image is manually switchable to a side image P2 as illustrated in FIG. 6. Further, a message region MS is provided at a lower side of the rear image P1 so that a message selected by the message processing unit 56a is displayed by the warning display processing unit 54c. In FIG. 5, "This is rear image" and "Pay attention to trailer's connection angle" are displayed as messages, for example. The warning unit 56 may output an audio message corresponding to the message displayed at the message region MS from the audio output device 32 via the audio control unit 38f.

The overhead view image BV generated by the overhead view image processing unit 54b is displayable at the display device 30. At the time of towing assistance, an own vehicle icon 10p and a trailer icon 12p may be displayed on the overhead view image BV. The own vehicle icon 10p and the trailer icon 12p may be displayed as being connected to each other in directions (postures) conforming to the connection angle acquired by the connection angle acquisition unit 50b. In FIG. 5, the towed vehicle 12 is positioned immediately behind the towing vehicle 10 so that the own vehicle icon 10p and the trailer icon 12p in the overhead view image BV are displayed to align each other. The captured image data of the imaging unit 24a imaging the rear region relative to the towing vehicle 10 includes a front end wall of the towed vehicle 12. Thus, the towed vehicle 12 imaged by the imaging unit 24a is displayed as a trailer image 12r which extends rearward in a case where the aforementioned captured image data is converted to the 2D data so that the towed vehicle 12 imaged by the imaging unit 24a is viewed from above. The overhead view image BV is displayed together with the rear image P1 serving as the actual image in a state of being arranged next to the rear image P1, so that the positional relation between the towing vehicle 10 and the towed vehicle 12 may be easily recognized by the driver.

FIG. 6 is a schematic view of a display where the side image P2 and the overhead view image BV are arranged side by side in a case where the connection angle between the towing vehicle 10 and the towed vehicle 12 becomes equal to or greater than the second angle (for example, ±5°) in a state where the towing vehicle 10 to which the towed vehicle 12 is connected is in the rearward driving available state. In FIG. 6, the towed vehicle 12 turns rightward relative to the towing vehicle 10. The image switching unit 54a determines whether the towed vehicle 12 turns leftward or rightward relative to the front-rear direction of the towing vehicle 10 (for example, relative to the vehicle center axis N in the front-rear direction of the vehicle 10, see FIG. 2) at the position of the towing device 18 based on the connection angle acquired by the connection angle acquisition unit 50b. Thus, the image switching unit 54a displays the side image obtained by either the imaging unit 24b or the imaging unit 24c corresponding to the turning direction of the towed vehicle 12 at the display device 30. The side image is displayed at the display device 30 so that a state in a travelling direction of the towed vehicle 12 upon turning thereof is confirmable. The posture (direction or position) of the towed vehicle 12 relative to the towing vehicle 10 may be easily recognized by the driver accordingly. In addition, a positional relation with an object in surroundings of the towing vehicle 10 (for example, a vehicle 60 or an obstacle 62, for example) may be easily recognized by the driver. In this case, the image switching unit 54a automatically switches the display image to the side image P2 based on the connection angle, so that the switching icon 58 is also automatically changed to a state where the side designation icon 58b is turned on. The overhead view image processing unit 54b also changes a connection state (i.e., a connection direction, position, or posture, for example) of the trailer icon 12p relative to the own vehicle icon 10p in the overhead view image BV based on the connection angle acquired by the connection angle acquisition unit 50b. The overhead view image BV is displayed together with the side image P2 serving as the actual image in a state of being arranged next to the side image P2, so that the connection state and the positional relation of the towed vehicle 12 relative to the towing vehicle 10 may be easily recognized by the driver.

The connection angle of the towed vehicle 12 relative to the towing vehicle 10 may be possibly already equal to or greater than the second angle (for example, ±5°) at the time the towing vehicle 10 is shifted to the rearward driving available state. In this case, the image switching unit 54a first displays the rear image P1 regardless of the connection angle so as to encourage the driver to pay attention to the rear region (rear side). Then, in a case where an operation by the driver is detected, i.e., an image switching operation by means of the switching icon 58, or a rearward driving operation by means of a steering operation or an acceleration operation is detected, for example, the image switching unit 54a switches the display image to the side image P2. As a result, the driver may easily pay attention to the rear region and also understand the turning posture of the towed vehicle 12. The display image may be switched to the rear image P1 by the driver's operation on the switching icon 58 after the side image P2 is displayed even when the first angle (for example, ±45°) is not achieved to thereby confirm the positional relation between the towing vehicle 10 and the towed vehicle 12.

Messages such as "This is right-side rear image" and "Pay attention to trailer's direction and object in surroundings", for example, are displayed at the message region MS arranged below the side image P2 by the warning display processing unit 54c. In this case, the warning unit 56 may output an audio message corresponding to the message displayed at the message region MS from the audio output device 32 via the audio control unit 38f.

Figure 7:
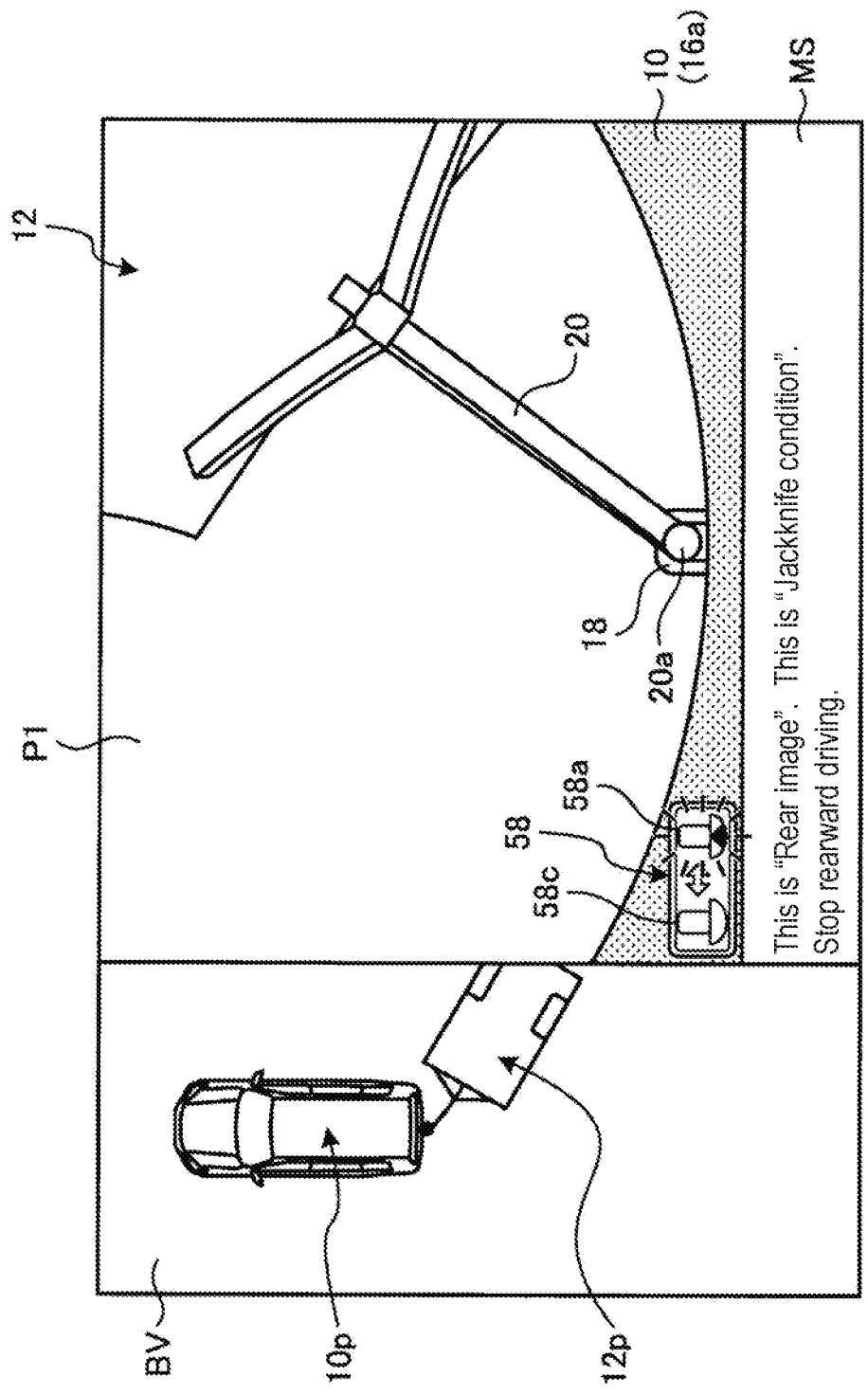
FIG. 7 is a schematic view illustrating an example of the rear image and the overhead view image displayed in a case where the connection angle between the towing vehicle and the towed vehicle reaches or exceeds a first angle in a state where the towing vehicle to which the towed vehicle is connected is in the rearward driving available state.

FIG. 7 is a schematic view of a display where the rear image P1 and the overhead view image BV are arranged side by side in a case where the connection angle between the towing vehicle 10 and the towed vehicle 12 becomes equal to or greater than the first angle (for example, ±) 45° in a state where the towing vehicle 10 to which the towed vehicle 12 is connected is in the rearward driving available state. In a case where the connection angle becomes equal to or greater than the first angle (for example, ±45°) so that the jackknife condition is satisfied, the connection angle is impossible to be changed to decrease by the steering during the rearward driving of the towing vehicle 10. That is, a turning control of the towed vehicle 12 is impossible so that a further rearward driving of the towing vehicle 10 may be dangerous as causing a contact (collision) between a rear end portion of the towing vehicle 10 and a front end portion of the towed vehicle 12. Thus, in order to encourage the driver to pay attention to the positional relation between the towing vehicle 10 and the towed vehicle 12, the image switching unit 54a switches the display content of the display device 30 to the rear image P1 by which the positional relation between the towing vehicle 10 and the towed vehicle 12 is easily understandable. In this case, the rear image P1 where the connection member 20 is greatly tilted (turned) relative to the towing vehicle 10 is again displayed so that the driver may easily realize a risk of jackknife condition. As a result, the driver may promptly stop a progression of jackknife condition, i.e., stop the rearward driving of the towing vehicle 10, and leave from the jackknife condition, i.e., restore the forward driving of the towing vehicle 10. The connection state (posture) of the trailer icon 12p relative to the own vehicle icon 10p in the overhead view image BV also greatly changes depending on the connection angle acquired by the connection angle acquisition unit 50b. The overhead view image BV is displayed together with the rear image P1 serving as the actual image while being arranged next to the rear image P1, so that the driver may easily realize a risk of jackknife condition.

In FIG. 7, messages such as "This is rear image", "This is jackknife condition", and "Stop rearward driving", for example, are displayed at the message region MS arranged below the rear image P1 by the warning display processing unit 54c. In this case, the warning unit 56 may output an audio message corresponding to the message displayed at the message region MS from the audio output device 32 via the audio control unit 38f.

Figure 8:
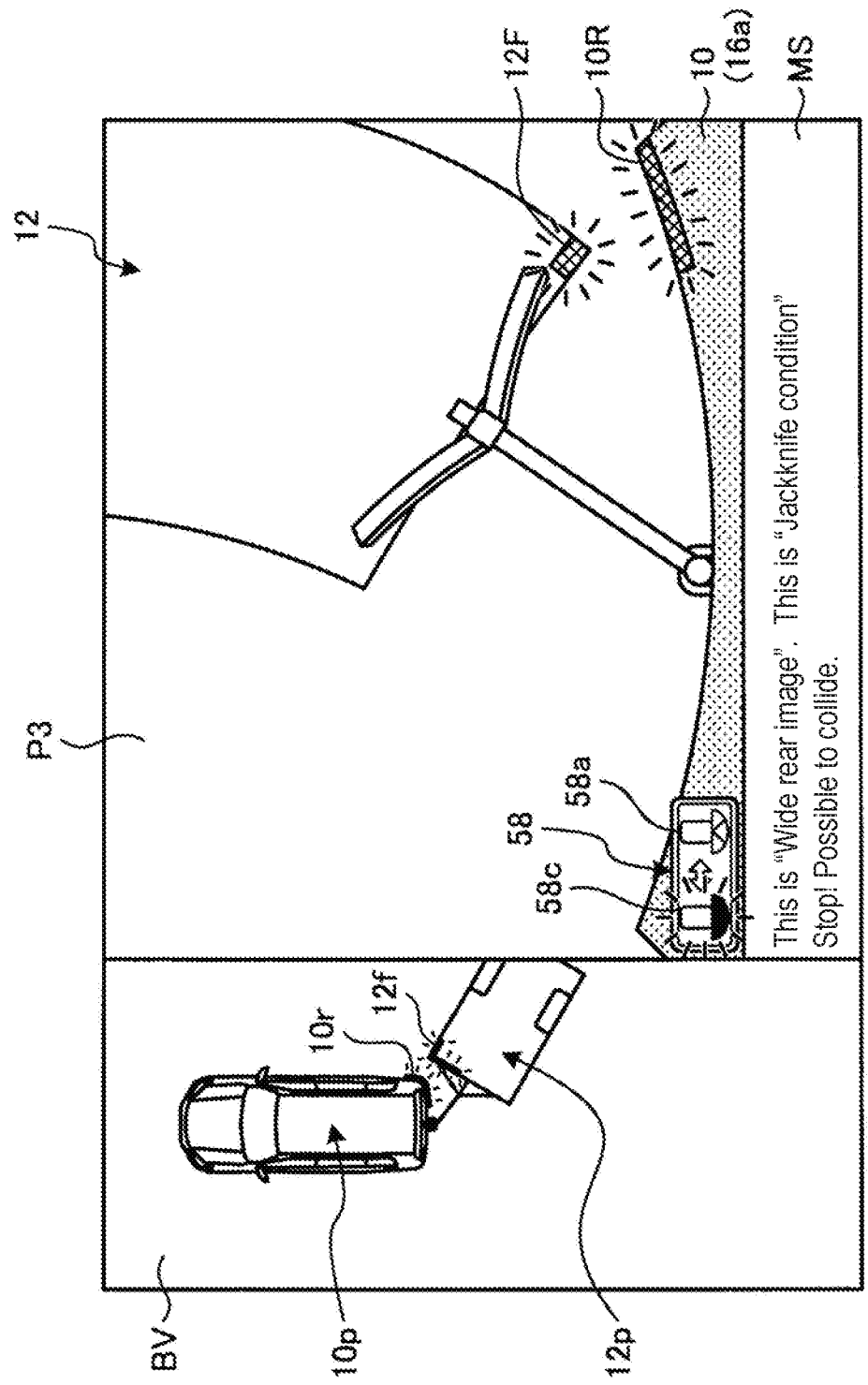
FIG. 8 is a schematic view illustrating an example of a wide rear image and the overhead view image displayed in a case where the connection angle between the towing vehicle and the towed vehicle reaches or exceeds the first angle in a state where the towing vehicle to which the towed vehicle is connected is in the rearward driving available state.

In a case where the connection angle becomes equal to or greater than the first angle, the switching icon 58 is displayed as being constituted by the rear designation icon 58a and a wide rear designation icon 58c. In a case where the wide rear designation icon 58c is turned on, a wide rear image P3 (see FIG. 8) including a wide width is displayed. The wide rear image P3 includes a greater width of a display region in the vehicle width direction as compared with the normal rear image P1. The wide rear image P3 illustrated in FIG. 8 is a modified example obtained in a case where the connection angle becomes equal to or greater than the first angle. The wide rear image P3 is achieved by expanding a portion (range) which is cutout from the image based on the captured image data acquired by the imaging unit 24a. Thus, an influence of distortion at a peripheral edge portion of the wide rear image P3 increases. Nevertheless, because the display region of the wide rear image P3 is enlarged as illustrated in FIG. 8, an area where the towing vehicle 10 and the towed vehicle 12 is displayable may increase. For example, in a case where the jackknife condition proceeds as illustrated in FIG. 8, respective portions of the towing vehicle 10 and the towed vehicle 12 which possibly make contact with each other are displayed. In FIG. 8, by the proceeding of the jackknife condition, a right front end portion 12F of the towed vehicle 12 and a right rear end portion 10R of the towing vehicle 10 may possibly make contact with each other. A possible position where the right front end portion 12F of the towed vehicle 12 and the right rear end portion 10R of the towing vehicle 10 make contact with each other may be easily recognized by the driver through the wide rear image P3, which may secure recognition of risk by the driver.

In another embodiment, the warning display processing unit 54c may perform highlight display by partially blinking the right front end portion 12F of the towed vehicle 12 and the right rear end portion 10R of the towing vehicle 10 which possibly make contact with each other or by changing a display color thereof to red, for example, as illustrated in FIG. 8 in a case where the connection angle becomes equal to or greater than the first angle. In this case, the driver may securely promptly recognize a position at which a contact may possibly occur (i.e., a portion with a risk of contact) caused by the jackknife condition. The warning display processing unit 54c may also highlight a right rear end portion 10r of the own vehicle icon 10p and a right front end portion 12f of the trailer icon 120 in the overhead view image BV. The highlight display may be performed on either the wide rear image P3 or the overhead view image BV though the highlight display performed on both the wide rear image P3 and the overhead view image BV may cause the driver to further securely recognize the position having a risk of contact.

In FIG. 8, messages such as "This is wide rear image", "This is jackknife condition", and "Stop! Possible to collide", for example, are displayed at the message region MS arranged below the wide rear image P3 by the warning display processing unit 54c. In this case, the warning unit 56 may output an audio message corresponding to the message displayed at the message region MS from the audio output device 32 via the audio control unit 38f.

The switching icon 58 including the rear designation icon 58a and the wide rear designation icon 58c displayed in a case where the connection angle becomes equal to or greater than the first angle may achieve switching between the normal rear image P1 and the wide rear image P3 each time the driver touches the switching icon 58 with one's finger, for example. That is, depending on a target of confirmation, i.e., depending on whether the driver desires to confirm the connection angle of the connection member 20 in detail by the normal rear image P1 which includes less distortion as compared to the wide rear image P3 or the driver desires to confirm a position having a possibility of contact by the wide rear image P3 displaying a wide range, for example, the normal rear image P1 and the wide rear image P3 are appropriately switched.

As a result, the driver may confirm a risk of jackknife condition in response to a driver's request. In a case where the connection angle becomes equal to or greater than the first angle, whether the display image is switched to the normal rear image P1 or to the wide rear image P3 may be specified beforehand or appropriately changed by the driver.

Figure 9:
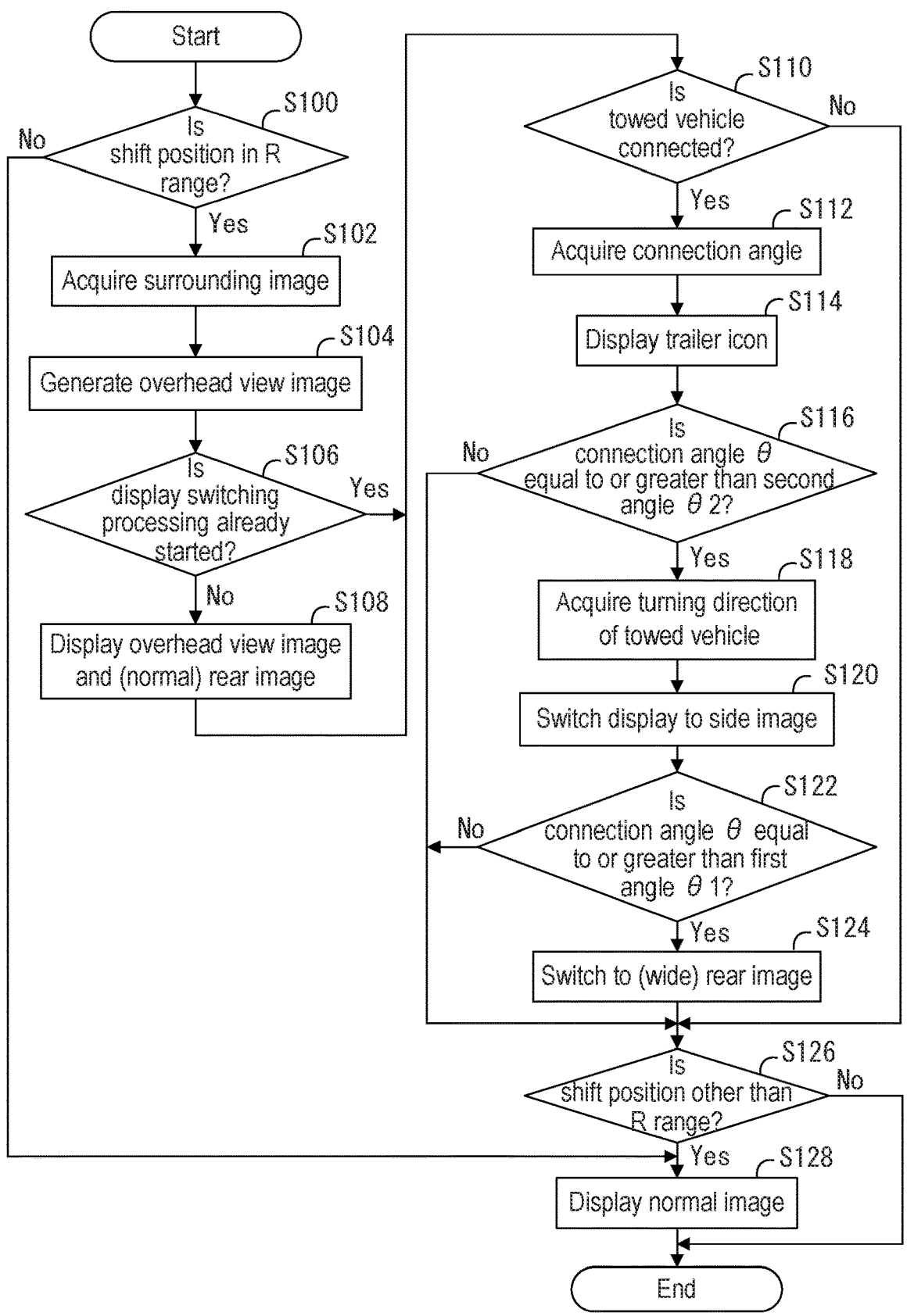
FIG. 9 is an example of procedures of a display switching processing performed by the towing assistance apparatus according to the embodiment.

Next, procedures of display switching processing performed by the towing assistance system 100 (towing assistance apparatus) including the aforementioned construction are explained with reference to a flowchart illustrated in FIG. 9. The processing of the flowchart illustrated in FIG. 9 is repeated at a predetermined cycle which is specified beforehand.

In a case where an ignition switch of the towing vehicle 10 is turned on, for example, and the towing assistance unit 48 is in an operable state, the shift state acquisition unit 50c determines whether or not the shift position is in "R" range based on the detection signal of the shift sensor 42 (S100). In a case where the shift position is in "R" range (Yes in S100), the image acquisition unit 50a acquires the surrounding image based on the captured image data obtained by the imaging units 24 (S102). Next, the overhead view image processing unit 54b generates the overhead view image BV by performing 2D data conversion processing and joining processing, for example, on the captured image data obtained by the imaging units 24 (S104). At this time, in a case where the display switching processing for the towing assistance by the image switching unit 54a is not yet started (No in S106), the image switching unit 54a performs the display processing for displaying the overhead view image BV and the rear image P1 (for example, the normal rear image) in a manner that the overhead view image BV and the rear image P1 are arranged next to each other as illustrated in FIG. 5 (S108). In a case where the display switching processing has already started (Yes in S106), an operation in S108 is skipped.

In a case where the towing assistance unit 48 confirms that the towed vehicle 12 is connected to the towing vehicle 10 (Yes in S110), the connection angle acquisition unit 50b performs a processing for acquiring the connection angle based on the rear image captured by the imaging unit 24a, for example (S112). Whether the towed vehicle 12 is connected to the towing vehicle 10 is detectable by means of the image processing of the rear image captured by the imaging unit 24a or by means of a sensor provide at the towing device 18, for example. In a case where the connection angle is acquired by the connection angle acquisition unit 50b, the overhead view image processing unit 54b displays the trailer icon 12p to be connected to the own vehicle icon 10p in the overhead view image BV at an angle corresponding to the aforementioned connection angle (S114). At this time, the warning display processing unit 54c superimposes a message corresponding to the display content of the rear image P1 which has been switched on the message region MS (see FIG. 5). The message processing unit 56a may output an audio message corresponding to the message displayed at the message region MS from the audio output device 32 via the audio control unit 38f.

Next, the connection angle determination unit 52 determines whether or not the connection angle θ acquired by the connection angle acquisition unit 50b becomes equal to or greater than a second angle θ2 (S116). In a case where the connection angle θ becomes equal to or greater than the second angel θ2 (Yes in S116), the image switching unit 54a acquires the turning direction of the towed vehicle 12 by referring to the connection angle acquired by the connection angle acquisition unit 50b (S118). The image switching unit 54a switches the display content of the display device 30 to the side image P2 captured by the imaging unit 24 provided in the turning direction of the towed vehicle 12 as illustrated in FIG. 6 (S120). At this time, the warning display processing unit 54c superimposes a message corresponding to the display content of the side image P2 which has been switched on the message region MS of the side image P2. The message processing unit 56a may output an audio message corresponding to the message displayed via the audio control unit 38f.

Next, the connection angle determination unit 52 determines whether or not the connection angel θ acquired by the connection angle acquisition unit 50b becomes equal to or greater than a first angle θ1 (S122). In a case where the connection angle θ becomes equal to or greater than the first angle θ1 (Yes in S122), the image switching unit 54a determines that the towed vehicle 12 is brought to the jackknife condition and then switches the display content of the display device 30 to the rear image P1 (see FIG. 7) or to the wide rear image P3 (see FIG. 8) captured by the imaging unit 24a (S124). At this time, the warning display processing unit 54c superimposes a message corresponding to the display content of the rear image P1 (or the wide rear image P3) which has been switched on the message region MS. In a case where the wide rear image P3 is displayed, the approach warning processing unit 56b may highlight portions which may possibly make contact with each other such as the right-rear end portion 10R and the right-front end portion 12F in FIG. 8, for example, based on the detection results of the distance measuring units 28a to 28d. In a case where an approach of an obstacle is detected on a basis of the detection results of the distance measuring units 28a to 28d in a state where the towed vehicle 12 is not connected to the towing vehicle 10, a portion of the towing vehicle 10 to which such obstacle approaches may be displayed via an indicator, for example. Thus, when the jackknife condition is established in a state where the towed vehicle 12 is connected to the towing vehicle 10, an approach (a possibility of approach) of the towed vehicle 12 may be alerted by means of the indicator for warning an approach of an obstacle.

The image switching unit 54a constantly monitors an acquisition result of the shift position of the shift state acquisition unit 50c during the towing assistance. In a case where the shift position is in a range other than "R" range (Yes in S126), it is determined that possibility of rearward driving of the towing vehicle 10 (the towed vehicle 12) is eliminated, i.e., a risk resulting from the jackknife condition is eliminated. The image switching unit 54a therefore displays the normal display screen (the normal image), i.e., the navigation screen or the audio screen, for example, at the display device 30 (S128) to terminate the present towing assistance processing and starts the operation from S100 in the next processing.

In a case where the shift position is in "R" range (No in S126), the operation in S128 is skipped and the operation from S100 is started in the next processing.

In a case where the connection angle θ is inhibited from being equal to or greater than the first angle θ1 (No in S122), the image switching unit 54a displays the operation (movement) of the towed vehicle 12 of which connection angle relative to the towing vehicle 10 changes in response to the operation (movement) thereof by maintaining the display of the side image P2 such as illustrated in FIG. 6. The processing is shifted to S126 to continue a subsequent processing. In the same way, in a case where the connection angle θ is inhibited from being equal to or greater than the second angle θ2 (No in S116), the image switching unit 54a displays the operation (movement) of the towed vehicle 12 of which connection angle relative to the towing vehicle 10 changes in response to the operation (movement) thereof by maintaining the display of the rear image P1 such as illustrated in FIG. 5. The processing is shifted to S126 to continue a subsequent processing.

In a case where the towing assistance unit 48 confirms that the towed vehicle 12 is not connected to the towing vehicle 10 (No in S110), the operations from S112 to S124 are skipped and the operations from S126 and later are continuously performed. In a case where the towed vehicle 12 is not connected to the towing vehicle 10, the warning display processing unit 54c displays "This is rear image" and "Pay attention to rear and object in surroundings", for example, at the message region MS as messages for rearward driving in a state where the towed vehicle 12 is not connected to the towing vehicle 10. In a case where the shift position is not in "R" range (No in S100), the operations from S102 to S126 are skipped and the operation at S128 is performed so that the navigation screen or the audio screen serving as the normal display screen (normal display image) is displayed.

According to the towing assistance system 100, when the jackknife condition is satisfied in a state where the towed vehicle 12 is connected to the towing vehicle 10, the positional relation between the towing vehicle 10 and the towed vehicle 12, i.e., the present state thereof, is displayed in the rear image serving as the actual image with which the positional relation is easily recognizable by the driver. As a result, further accurate information about the positional relation between the towing vehicle 10 and the towed vehicle 12 may be provided to the driver, which may decrease a feeling of anxiety of the driver and cause the driver to appropriately operate (steer) the towing vehicle 10.

The flowchart illustrated in FIG. 9 is provided as an example. Accordingly, increase or decrease of the number of steps and change in processing order may be appropriately conducted as long as the similar image switching processing is achieved, which may result in the similar effect to the aforementioned embodiment. According to the flowchart illustrated in FIG. 9, the image switching is conducted in the order of the normal rear image, the side image, and the wide rear image. At this time, the rear image is at least displayed in a case where the connection angle is equal to or greater than the first angle so that the driver recognizes that the jackknife condition is established. Thus, while the rear image is being displayed, the driver may operate the switching icon 58 to change the display so that the image in response to the request of the driver may be displayed, which may lead to the similar effect to the aforementioned embodiment.

In FIGS. 5 to 8, the overhead view image BV and either the rear image P1, the side image P2, or the wide rear image P3 are displayed in a state of being arranged next to each other. In another embodiment, the overhead view image BV may be omitted. In further another embodiment, a size and a layout of a display region where the overhead view image BV and either the rear image P1, the side image P2, or the wide rear image P3 are displayed may be changed. With such construction, the similar effect to the aforementioned embodiment is also obtainable.

The towing assistance program performed by the CPU 38a may be provided as a file that is installable or executable and that is stored at a recording medium such as a CD-ROM, a flexible disk (FD), a CD-R, and a digital versatile disk (DVD), for example, readable by a computer.

The towing assistance program may be also provided in a manner to be stored on a computer connected to a network such as an internet, for example, and to be downloaded via the network. Further, the towing assistance program performed in the embodiment may be provided or distributed via a network such as an internet, for example.

According to the aforementioned embodiment, a towing assistance apparatus includes an image acquisition unit 50a successively acquiring a rear image and a lateral image each of which serves as a surrounding image captured by an imaging unit 24 that is provided at a towing vehicle 10 to which a towed vehicle 12 is configured to be connected, the rear image including a rear region of the towing vehicle 10 and the lateral image including a lateral region of the towing vehicle 10, a connection angle acquisition unit 50b acquiring a connection angle θ between the towing vehicle 10 and the towed vehicle 12, and a display processing unit 54 switching the surrounding image displayed at a display device 30 from the lateral image to the rear image in a case where the connection angle becomes equal to or greater than a first angle θ1 at which a change control for decreasing the connection angle θ is impossible by a steering of the towing vehicle 10 during a rearward driving thereof in a state where the lateral image is displayed at the display device 30 and the towing vehicle 10 to which the towed vehicle 12 is connected is in a rearward driving available state.

Accordingly, in a case where the connection angle θ becomes equal to or greater than the first angle θ1 at which a jackknife condition is established so that the change control for decreasing the connection angle θ is impossible by the steering during the rearward driving of the towing vehicle 10, the display content of the display device 30 is switched to the rear image. As a result, the positional relation between the towing vehicle 10 and the towed vehicle 12 is easily understandable by the driver of the towing vehicle 10.

According to the embodiment, the display processing unit 54 displays the rear image as the surrounding image at the display device 30 in a case where the towing vehicle 10 to which the towed vehicle 12 is connected is shifted to the rearward driving available state, the display processing unit 54 switching the surrounding image displayed at the display device 30 to the lateral image capturing an inner side of a turning of the towed vehicle 12 in a case where the connection angle θ becomes equal to or greater than a second angle θ2 which is smaller than the first angle θ1 with reference to a front-rear direction of the towing vehicle 10, the display processing unit 54 switching the surrounding image displayed at the display device 30 to the rear image in a case where the connection angle θ reaches the first angle θ1.

Accordingly, the positional relation between the towing vehicle 10 and the towed vehicle 12 at the time the rearward driving is started and the operation of the towed vehicle 12 at the time the connection angle θ becomes equal to or greater than the second angle θ2 are easily understandable. Then, at the time the connection angle θ reaches the first angle θ1 at which the jackknife condition is satisfied, an inner side of turning of the towed vehicle 12 is displayed, so that the positional relation between the towing vehicle 10 and the towed vehicle 12 is easily understandable. As a result, the positional relation between the towing vehicle 10 and the towed vehicle 12 after the rearward driving available state is satisfied is easily understandable.

According to the embodiment, the display processing unit 54 increases a display region of the rear image in a vehicle width direction displayed in a case where the connection angle θ becomes equal to or greater than the first angle θ1 than a display region of the rear image in the vehicle width direction displayed in a case where the towing vehicle 10 is shifted to the rearward driving available state.

Accordingly, in a case where the connection angle θ becomes equal to or greater than the first angle θ1 at which the jackknife condition is satisfied, for example, the positional relation between the towing vehicle 10 and the towed vehicle 12 which largely turns relative to the towing vehicle 10 is easily recognizable.

According to the embodiment, the towing assistance apparatus further includes a warning unit 56 warning that the change control for decreasing the connection angle θ is impossible by the steering of the towing vehicle 10 during the rearward driving thereof in a case where the connection angle θ reaches the first angle θ1.

Accordingly, a reason why the display content of the display device 30 has been switched may be easily understandable by the driver of the towing vehicle 10, for example. In addition, the driver may easily recognize that paying attention to driving is necessary because the connection angle θ reaches the first angle θ1 at which the jackknife condition is established.

According to the embodiment, the display processing unit 54 displays a possible position at which the towing vehicle 10 and the towed vehicle 12 make contact with each other at the display device 30 in a case where the connection angle θ becomes equal to or greater than the first angle θ1.

Accordingly, a phenomenon that may possibly occur after the connection angle θ reaches the first angle θ1 at which the jackknife condition is satisfied may be easily understandable by the driver and the driver may be securely alerted to a possible danger.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A towing assistance apparatus comprising:
   an image acquisition unit successively acquiring a rear image and a lateral image each of which serves as a surrounding image captured by an imaging unit that is provided at a towing vehicle to which a towed vehicle is configured to be connected, the rear image including a rear region of the towing vehicle and the lateral image including a lateral region of the towing vehicle;
   an angle acquisition unit acquiring a connection angle between the towing vehicle and the towed vehicle; and
   a display processing unit switching the surrounding image displayed at a display unit from the lateral image to the rear image in a case where the connection angle becomes equal to or greater than a first angle at which a change control for decreasing the connection angle is impossible by a steering of the towing vehicle during a rearward driving thereof in a state where the lateral image is displayed at the display unit and the towing vehicle to which the towed vehicle is connected is in a rearward driving available state.

2. The towing assistance apparatus according to claim 1, wherein the display processing unit displays the rear image as the surrounding image at the display unit in a case where the towing vehicle to which the towed vehicle is connected is shifted to the rearward driving available state, the display processing unit switching the surrounding image displayed at the display unit to the lateral image capturing an inner side of a turning of the towed vehicle in a case where the connection angle becomes equal to or greater than a second angle which is smaller than the first angle with reference to a front-rear direction of the towing vehicle, the display processing unit switching the surrounding image displayed at the display unit to the rear image in a case where the connection angle reaches the first angle.

3. The towing assistance apparatus according to claim 2, wherein the display processing unit increases a display region of the rear image in a vehicle width direction displayed in a case where the connection angle becomes equal to or greater than the first angle than a display region of the rear image in the vehicle width direction displayed in a case where the towing vehicle is shifted to the rearward driving available state.

4. The towing assistance apparatus according to claim 1, further comprising a warning unit warning that the change control for decreasing the connection angle is impossible by the steering of the towing vehicle during the rearward driving thereof in a case where the connection angle reaches the first angle.

5. The towing assistance apparatus according to claim 1, wherein the display processing unit displays a possible position at which the towing vehicle and the towed vehicle make contact with each other at the display unit in a case where the connection angle becomes equal to or greater than the first angle.

* * * * *